Figure 5:
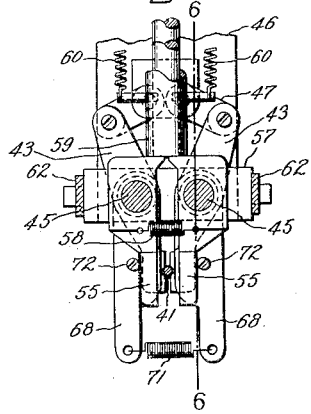

June 12, 1928. 1,673,731
R. BRINDLE, JR
METHOD OF AND MECHANISM FOR FEEDING BEADS
Filed April 14, 1926 2 Sheets-Sheet 1

Inventor:
Robert Brindle, Jr,
by *Alexander S. [signature]*
His Attorney.

June 12, 1928.    R. BRINDLE, JR    1,673,731
METHOD OF AND MECHANISM FOR FEEDING BEADS
Filed April 14, 1926    2 Sheets-Sheet 2

Inventor:
Robert Brindle, Jr,
by
His Attorney.

Patented June 12, 1928.

1,673,731

UNITED STATES PATENT OFFICE.

ROBERT BRINDLE, JR., OF WEST ORANGE, NEW JERSEY, ASSIGNOR TO GENERAL ELECTRIC COMPANY, A CORPORATION OF NEW YORK.

METHOD OF AND MECHANISM FOR FEEDING BEADS.

Application filed April 14, 1926. Serial No. 102,062.

My invention relates to the feeding of annular beads or rings of glass from a loose mass of beads, and more particularly to a device for delivering such beads one at a time and threading them over a wire, such as the lead wire of the mount for miniature incandescent lamps.

In making a common form of miniature incandescent lamp, two lead wires are held side by side in a head or holder, an annular bead or ring of glass is placed over them, and the glass fused into a bead in which the lead wires are embedded. Usually the placing of the ring or bead of glass over the lead wires is a hand operation which requires considerable skill and is comparatively slow and expensive.

One object of my invention is to provide a method of and means for automatically delivering rings or annular beads of glass or similar material at a predetermined point and threading or placing them on a wire such as the lead wire of an incandescent lamp mount or similar article.

Another object is to provide a device which will pick up rings or beads from a loose mass and automatically deliver one or more of them at a time at a predetermined delivery point.

A further object is to provide a device which will automatically feed and deliver beads or rings of glass one by one, even though the beads are rough on the edges and have a tendency to stick together.

In accordance with my invention I provide a device which automatically threads the annular beads on a vertical rod, down which they slide, and from the lower end of which they are automatically delivered one by one by an automatic delivery mechanism.

One form of delivery mechanism comprises two rod grippers, such as two pairs of jaws spaced vertically along the rod and constructed to open and close alternately and permit a bead to pass between one pair of jaws while the other pair is closed. The rod on which the bead is threaded is loose, and would fall endwise were it not held by one or the other pair of jaws, the lower or rod holding pair of jaws holding the rod while the upper pair is open, and the upper or rod gripping pair being closed to grip the rod and hold it while the lower pair opens to permit the bead to drop off the lower end of the rod. I may also provide auxiliary bead control means to permit only one bead at a time to drop through the upper pair of jaws and to hold back the string of beads on the vertical rod while the upper pair of jaws is open, and thereby prevent the whole string of beads sliding down the rod whenever the upper pair of jaws opens, because the beads would then come between the upper jaws and prevent their gripping and holding the rod while the lower jaws are open. This auxiliary bead control insures that the portion of the rod between the upper pair of jaws will always be free of beads and will be seized and held when the jaws close.

Although the vertical feed rod on which the beads are threaded is loose, yet the beads slide down it and pass one by one through the upper pair of jaws and then through the lower pair of jaws to the delivery end of rod, while the rod is kept from falling by being always held in place by either one or the other pair of jaws. The rings or beads are preferably picked up from a loose mass by some suitable pick-up device which sweeps through the loose mass and picks up several beads from the mass preferably by threading them on a pin and then permitting them to slide off this pin onto the vertical rod controlled by the jaws.

Figure 6:
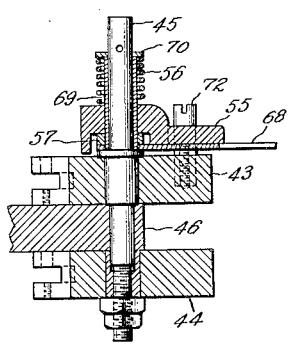
Figure 7:
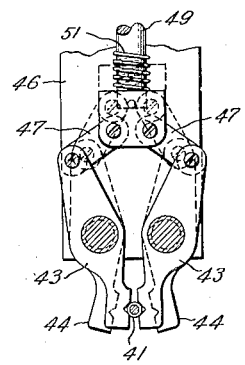

My invention will best be understood in connection with the accompanying drawings, in which I have shown, merely for purposes of illustration, one of the various forms of device in which my invention may be embodied and in which Fig. 1 is a view of a bead-feeding device on a miniature lamp-making machine; Fig. 2 is a side view of the bead-feeding device shown in Fig. 1; Fig. 3 is an end view, on an enlarged scale showing the bead feeding jaws; Fig. 4 is a perspective of the bead feeding jaws and actuating mechanism; Fig. 5 is a cross section on the line 5—5 of Fig. 3; Fig. 6 is a longitudinal section along the line 6—6 of Fig. 5; Fig. 7 is a cross section on the line 7—7 of Fig. 3; while Figs. 8 to 13, inclusive, are diagrammatic views of the progress of a bead through the bead feeding jaws.

In the particular machine illustrated in the drawing, the bead-feeding device is mounted on a table 15 which carries the usual horizontally rotatable spider 16, not shown in Fig. 1, and of which only a portion is shown in Fig. 2. This spider has on its rim the usual lead wire holders 17 for the holding two lead wires 18 side by side with their ends over which the bead is to be placed projecting vertically from the holder. The spider 16 is intermittently driven by any well-known intermittent gearing from a drive shaft 19, also geared to a cam shaft 20, on which is mounted a cam 21 for actuating a cam lever 22, having a cam roller 23 which is positively forced toward the shaft 20 by a return cam 24, and normally held in contact with the cam 21 by a spring 25. The cam lever 22 is connected to a push rod 26 slidably mounted in a bushing 27 on the table 15 to reciprocate and actuate the bead feeding device.

The particular bead feed device shown has a standard 28 with yoke 29 at the upper end. A hopper 30 for the loose beads is mounted in the yoke 29 and is preferably constructed so that the lower part 31 is a tray which can be removed endwise to facilitate disposal of broken beads and pieces of glass.

The beads are picked up from a mass of loose beads in the hopper by a pick-up device, such as a bead pick-up pin 32, mounted to sweep through the loose mass of beads in the hopper, and thereby thread some of the beads on the pin, which then moves into position where the beads on it will slide off the pick-up pin and be delivered where desired. The pick-up pin is mounted to project from and in the plane of movement of an oscillating arm 33 which sweeps through the hopper through nearly three-fourths of a revolution. The arm 33 is mounted on an oscillating shaft 34 oscillated preferably through a yielding or resilient driving connection such as a coil spring 36 from a pinion 35 loosely mounted on the shaft and in mesh with a toothed quadrant 37 mounted on an actuating rock shaft 38 for the device. This rock shaft is oscillated by a crank 39 connected through a link 40 to the push rod 26, and as the push rod 26 reciprocates the rock shaft oscillates and swings the bead pick-up pin back and forth through the mass of loose beads in the hopper.

The beads picked up from the mass in the hopper are threaded upon a vertical feed rod 41, the upper end of which extends into the hopper through a port just large enough to permit the passage of a bead threaded on the rod. When the bead pick-up pin 32 reaches the end of its clockwise travel, its free end is in register with the upper end of the feed rod 41, and the beads slide off the pick-up pin and onto the feed rod.

The feed rod 41 is a loose rod reduced in diameter slightly at two places along its length to produce shoulders 42, and is held in place by two pairs of rod gripping or transfer jaws 43 and 44, which alternately open and close upon the reduced parts of the feed stem, but in such sequence that one or the other pair is always closed to hold the bead feed rod 41 in place. Both pairs of transfer jaws are mounted on the long pivots 45 fixed in a lug 46 on the standard 28, and are actuated through the links 47 and 48 from push rods 49 and 50 controlled by springs 51 and 52 which yieldingly close the transfer jaws on the feed stem 41 unless the springs are overpowered. To open the transfer jaws, the ends of the push rods are provided with rollers 53 and 53ª which cooperate with a rocker cam 54 on the rockshaft 38, which is between the push rods, so that one pair of transfer jaws is left free to be closed by its spring when the other pair is positively opened by the rocker cam. As the shaft 38 rocks back and forth, the rod grippers on transfer jaws 43 and 44 are opened and closed alternately, but in such a sequence that the feed rod 41 never drops out of the jaws, although a bead resting on the upper or rod gripping jaws 43 will drop through them and down along the feed rod onto the lower or rod holding jaws 44 when the upper jaws open, and will then drop through the lower jaws along the feed stem and off its end when the lower jaws open. The transfer jaws can thus pass a bead through them along the feed rod without dropping it.

Only one bead at a time should pass the transfer jaws, and to this end I provide a bead control mechanism comprising a pair of bead holding jaws 55, mounted above the upper transfer jaws 43, to swing on the pivots 45 and also to move bodily away from the upper jaws 43 by sliding longitudinally of the pivots against springs 56. The bead holding jaws are carried on a vertically movable saddle 57 in such a way that when closed by a spring 58 they will not come any closer together than shown in Fig. 5. The bead holding jaws are positively opened by a reciprocating push rod 59, normally held in jaw-closing position by springs 60, and positively moved to open the jaws by a tail 61 on the rocker cam on the rockshaft 38, as best shown in Fig. 4.

Figure 8:
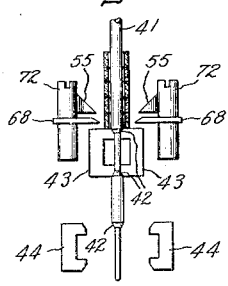
Figure 9:
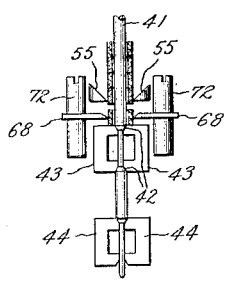

The bead holding jaws are positioned, as appears from Figs. 8 and 9, to close upon and hold the bead which is next above the bead resting on the upper transfer jaws 43. While the bead holding jaws are closed, the saddle 57 is lifted, and lifts with it the jaws 55 and the bead held between them, and thereby lifts along the feed rod the column of beads threaded on it. As a result, only the lowermost bead of the column is left on the transfer jaws 43, and when these jaws open only that one bead drops through. The saddle 57 is preferably lifted through links 62 connected to the ends of the saddle and to lifting arms 63 on a lifter shaft 64 mounted in a bracket 65 on the lug 46, and actuated through a lifting lever 66 from a lifting cam 67 on the rockshaft 38. While the saddle 57 is raised, the upper transfer jaws 43 are opened to pass a bead through them and closed to receive the next bead.

The beads, particularly those made by cutting a glass tube into very short lengths, have a tendency to stick to one another, and therefore I prefer to construct the bead control mechanism to include some means for positively detaching the lowermost bead which is to be passed through the transfer jaws, from the column of beads on the feed rod. The particular means shown comprises intermediate or bead gripping jaws 68 mounted to swing on the pivots 45 and having sleeves 69 held in place on the pivots by collars 70 secured to the pivots to prevent upward movement of the sleeves when the bead holding jaws, which swing on the sleeves as pivots, are lifted by the saddle 57. The intermediate or bead gripping jaws 68 are substantially knife blades mounted, as shown in Figs. 3 and 8, to grip the lowermost bead of the column on the feed rod, and normally held closed by a spring 71. Each intermediate jaw is provided with a pin 72 which projects from the jaw into the path of the bead holding jaws and of the upper transfer jaws, so that when either the bead holding jaws or the upper transfer jaws open, the bead gripping jaws will also open.

In some cases, particularly when the beads are formed by cutting a glass tube into short sections, it may be desirable to provide means for keeping the upper end of the feed rod clear of broken beads. One convenient way of doing this is to provide a compressed air jet 73, which discharges along the tip of the feed rod and is supplied with compressed air through a hose 74. To control the flow of air, I may drill a hole in the push rod 26, to cooperate with corresponding holes in the guide 27, thereby forming a valve which admits air to the hose 74 through a nozzle 75 on the side of the guide 27.

Figure 10:
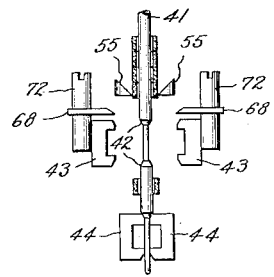
Figure 11:
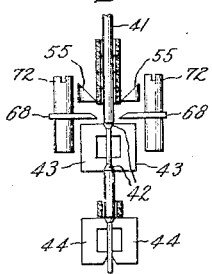
Figure 12:
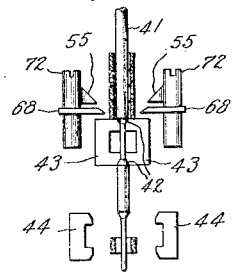
Figure 13:
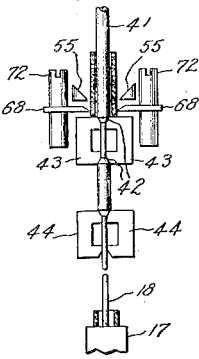

The operation of the particular machine illustrated in the drawing is as follows:

The bead pick-up pin 32 sweeps back and forth through the loose mass of beads in the hopper, and at the end of its movement in a clockwise direction places the picked-up beads on the upper end of the bead rod 41, thereby automatically stringing them on the feed rod. Since the pick-up pin 32 picks up two or more beads on each sweep, while only one bead at a time is delivered from the lower end of the feed rod 41, a column of beads soon accumulates on the feed rod. During each cycle of operation of the machine, the lowermost bead of this column on the feed rod 41 is automatically passed along through the transfer jaws 43 and 44, and drops off the lower end of the feed rod into place over the lead wires 18 in the holder 17. At the particular point of the cycle shown in Fig. 8 the upper transfer jaws 43 are closed, the bead holding jaws 55 as well as the intermediate or bead gripping jaws 68 are open, and the column of beads on the rod 41 rests on the upper transfer jaws 43. The bead holding jaws 55 then close, gripping the bead immediately above the lowermost bead, and the saddle 57 then rises, carrying the bead holding jaws 55 with it and also lifting the column of beads, as shown in Fig. 9, because the bead immediately above and adjoining the lowermost bead of the column is firmly gripped by the bead holding jaws 55. As the bead holding jaws closed, the intermediate or bead gripping jaws 68 also closed, and seized the lower most bead resting on the upper transfer jaws 43, so that the lowermost bead is positively separated from the adjoining bead immediately above it as the bead holding jaws rise. At the same time the lower transfer jaws 44 closed and are now holding the feed rod 41. The upper transfer jaws 43 now open, as shown in Fig. 10, and through the pins 72 also open the intermediate jaws 68, thereby releasing the lowermost bead, which passes through the open upper transfer jaws 43 by dropping down along the feed rod 41 until it rests on the closed lower transfer jaws 44. The upper transfer jaws 43 now close, as shown in Fig. 11, gripping the feed rod 41 and permitting the intermediate jaws 68 to close. While the upper transfer jaws 43 are holding the feed rod 41, the lower transfer jaws 44 open, as shown in Fig. 12, and the bead drops through the lower transfer jaws. At the same time, the bead holding jaws 55 again open with the lower transfer jaws, thereby permitting the column of beads which was held up by the closed bead holding jaws to slide down along the feed rod 41, while the intermediate jaws 68 also open with the lower transfer jaws and move out of the path of the column of beads, which slides down the feed rod until stopped by the closed upper transfer jaws 43. The parts are now in substantially the position shown in Fig. 8, the lowermost bead of the column resting on the upper transfer jaws 43, and being gripped by the intermediate jaws 68, while the bead immediately above it is gripped by the bead holding jaws.

During the transfer of the lowermost bead through the transfer jaws, the saddle 57 drops back to its initial position. It is immaterial whether the saddle drops back before or after the upper transfer jaws close, as the closed bead holding jaws prevent the column of beads sliding off the feed rod when the upper transfer jaws are open.

Although I have illustrated my invention as embodied in a device for feeding beads for use in the manufacture of mounts for miniature incandescent lamps, it may be used for feeding any kind of annular bodies.

For convenience and simplicity, I prefer to use gravity as the force which moves the beads along the feed rod 41, but the column of beads may be moved along the feed rod by spring pressure or other force if the feed rod is in a position other than vertical.

What I claim as new, and desire to secure by Letters Patent of the United States, is:

1. In an annular bead feeding device, the combination of a feed rod on which the beads may be strung, and means cooperating with said feed rod for restraining movement of the column of beads along the rod while alternately seizing and releasing said rod at adjacent points to pass along said rod a bead between said points.

2. In an annular bead feeding device the combination of a vertical feed rod on which the annular beads may be strung, two pairs of transfer jaws mounted side by side to seize said rod when closed, bead holding means mounted above and adjacent to the upper pair of transfer jaws and operative to prevent movement of the beads along said feed rod and actuating means for rendering said bead holding means operative and alternately opening and closing said pairs of jaws on said feed rod.

3. In an annular bead feeding device, the combination of a vertical feed rod on which the annular beads may be strung, two pairs of horizontal transfer jaws mounted side by side to close upon said rod, bead feeding jaws mounted adjacent one pair of transfer jaws in position to restrain movement of the beads along said rod when closed, and means for actuating said pairs of transfer jaws alternately and maintaining said bead feeding jaws closed while the adjacent pair of transfer jaws is open.

4. In an annular bead feeding device the combination of a loose vertical straight feed rod on which the beads may be strung, bead stringing means for stringing the beads on said feed rod, bead dropping means comprising two grippers spaced along said rod and operable alternately to seize and release said rod and thereby drop the beads from the lower end of said rod one bead at a time without dropping the rod, and common actuating means for said bead stringing means and said bead dropping means.

5. In a bead feeding device for annular beads, the combination of a loose vertical feed rod, means for stringing beads on said rod, two pairs of horizontal transfer jaws cooperating with said rod near its lower end, bead holding means associated with said transfer jaws for gripping the bead adjoining the lowermost bead, and actuating means for opening and closing said pairs of transfer jaws alternately and for rendering said bead holding means operative while the adjacent pair of transfer jaws are open.

6. In a bead feeding device for annular beads the combination of a loose vertical feed rod, means for stringing the annular beads on said rod, two pairs of horizontal transfer jaws mounted side by side to cooperate with said feed rod near its lower end, bead holding jaws adjacent one pair of transfer jaws for holding the bead adjoining the lowermost bead, and means for keeping the bead holding jaws closed while said pairs of transfer jaws are alternately opened and closed to permit the lowermost bead to pass through the transfer jaws.

7. In a device of the character described the combination of two pairs of rod holding transfer jaws mounted side by side, a pair of bead feeding jaws mounted adjacent one pair of said transfer jaws to be bodily movable toward and away from said pair of jaws, a pair of intermediate jaws mounted between said bead feeding jaws and said transfer jaws to seize when closed a bead resting on said transfer jaws, means for actuating said bead feeding jaws and the adjacent pair of transfer jaws in synchronism and alternately with the other pair of transfer jaws, and connections whereby said intermediate jaws are opened simultaneously with either the bead feeding jaws or the adjacent pair of transfer jaws.

8. In a device of the character described the combination of two pairs of rod holding transfer jaws mounted side by side, a pair of bead feeding jaws mounted adjacent one pair of said transfer jaws, resilient means for closing each pair of jaws, and actuating mechanism for opening said pairs of jaws comprising a push rod for each pair of jaws, a rock shaft, and a rocker cam on said shaft for positively actuating the push rod of one pair of transfer jaws when rocked in one direction and actuating the push rods of the other pair of transfer jaws and of the bead feeding jaws when rocked in the other direction.

9. The method of feeding annular bodies which consists of stringing said bodies in a column on a loose vertical feed rod, seizing the feed rod at one point to hold it and releasing it to permit the lowermost body of the column to slide along the rod and pass said point, restraining and releasing the column of bodies on the rod alternately with the release and seizure of the rod at said point, and seizing the rod at another point while it is released at the first point and thereby retaining the rod in place during the passing of the first point by said lowermost body.

10. The method of feeding annular bodies which consists in stringing the bodies on a loose vertical feed rod, alternately seizing and releasing said rod at adjacent points to permit some of said bodies to pass said points without dropping the rod, and restraining the movement along the rod of said bodies above the upper one of said points while the rod is released at said upper point.

11. The method of feeding annular bodies which consists in stringing said bodies on a loose vertical feed rod, gripping and releasing the rod alternately at adjacent points to permit some of said bodies to pass by said points while the rod is retained in place, and gripping an intermediate body of the column on the rod to restrain movement of the upper part of said column while the lower part slides down the rod past the upper point to the lower point at which the rod is gripped.

12. In a feeding device for annular beads, the combination of a feed rod on which annular beads may be strung, gripping means for intermittently seizing and releasing the rod at different points, bead control means intermittently operating to permit movement of some of the beads along the rod past one of said points while preventing movement of the remainder along said rod, and actuating mechanism for operating said control means and said gripping means in sequence to cause some of said bodies to pass one of said points while said control means is operative and to pass the other point while said control means is inoperative.

13. In a device for feeding beads from a column of annular beads strung on a rod, the combination of a rod gripper closed to hold the rod and opened to permit the passage of a bead along the rod, a bead holder closed to prevent and opened to permit bead movement along the rod, a rod holder operative to hold the rod in place while the gripper is open, and actuating means for closing and opening said bead holder alternately with said rod gripper and simultaneously with the holding and releasing of the rod by said rod holder.

14. In a device for feeding beads from a column of annular beads strung on a rod, the combination of two rod grippers opened to release and closed to hold the rod, a set of bead holding jaws adjacent one gripper, and actuating means for opening and closing the bead holding jaws alternately with the adjacent rod gripper and simultaneously with the remote rod gripper.

15. In a device for feeding beads from a column of annular beads strung on a rod, the combination of rod gripping jaws for seizing the rod when closed, bead holding jaws mounted above the rod gripping jaws at a distance slightly greater than the length of a bead to seize a bead on the rod when closed, rod holding jaws mounted below said rod gripping jaws, and actuating means for opening and closing all of said jaws in sequence to permit the passage of a bead along the rod and through said jaws without dropping the rod.

16. In a device for feeding beads from a column of annular beads strung on a rod, the combination of bead holding jaws and rod holding jaws side by side, rod gripping jaws between said bead holding jaws and said rod holding jaws, and actuating means for opening and closing said bead holding jaws alternately with the rod gripping jaws and simultaneously with said rod holding jaws.

17. In a device for feeding beads from a column of annular beads strung on a rod, the combination of a rod gripper for seizing and releasing the rod alternately with said rod gripper, a bead control device adjacent said rod gripper and closed to restrain movement of the column of beads on the rod and positively detach the lowermost bead on the rod from the column of beads, and actuating means for opening and closing said bead control device in synchronism with said rod holder and alternately with said rod gripper.

18. In a device for feeding beads from a column of annular beads strung on a rod, the combination of a pair of transfer jaws cooperating with the rod, bead holding jaws mounted adjacent said transfer jaws to seize when closed a bead on said rod and movable bodily along said rod away from said transfer jaws, bead gripping jaws intermediate said rod gripper and said bead restraining jaws to seize and hold another bead immediately adjacent the bead seized by said feed holding jaws, and actuating means for closing all said jaws and moving said bead holding jaws away from said transfer jaws and from said bead gripping jaws while closed to positively separate the bead in said bead holding jaws from the bead in said bead gripping jaws.

19. In a device for feeding beads from a column of annular beads strung on a rod, the combination of a pair of horizontal rod gripping jaws, a pair of horizontal bead holding jaws mounted above said rod gripping jaws at a distance slightly greater than the length of the beads to be fed, a pair of horizontal rod holding jaws mounted below said rod gripping jaws, and actuating means for opening and closing said bead holding jaws simultaneously with said rod holding jaws and alternately with said rod gripping jaws to permit beads to pass downward through said jaws without dropping the rod.

20. In a device for feeding beads from a column of annular beads strung on a rod, the combination with two sets of transfer jaws mounted side by side, and actuating means for alternately opening and closing said jaws, of bead detaching means comprising a bead holder for seizing when closed a bead in the column of beads on the feed rod, a bead gripper adjacent said bead holder for seizing when closed an adjoining bead in said colunm, and connections from said bead holder and said bead gripper to said actuating means for producing bodily movement of said bead holder and said bead gripper relatively to each other while closed to positively separate said adjoining beads.

21. In a device for feeding beads from a column of annular beads strung on a rod, the combination with two sets of transfer jaws mounted side by side, and actuating means for alternately opening and closing said jaws, of means for positively detaching beads from the column of beads on the feed rod comprising bead holding jaws and bead gripping jaws mounted side by side to seize adjoining beads in the column when near each other and bodily movable away from each other to positively separate said adjoining beads, and actuating means for opening and closing said bead holding and bead gripping jaws and for moving them bodily away from each other while closed.

In witness whereof, I have hereunto set my hand this 9th day of April, 1926.

ROBERT BRINDLE, Jr.